Patented Aug. 20, 1940

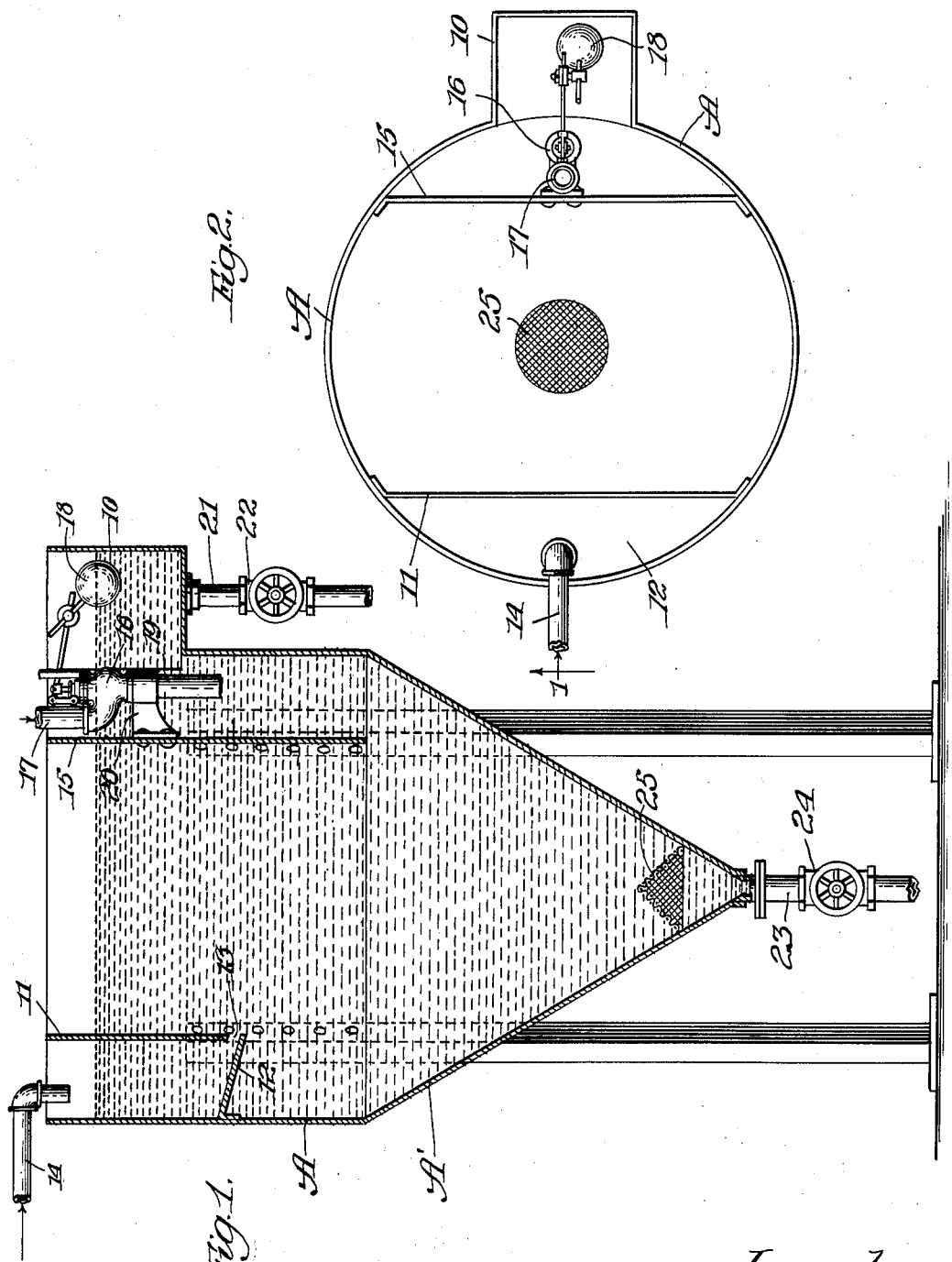

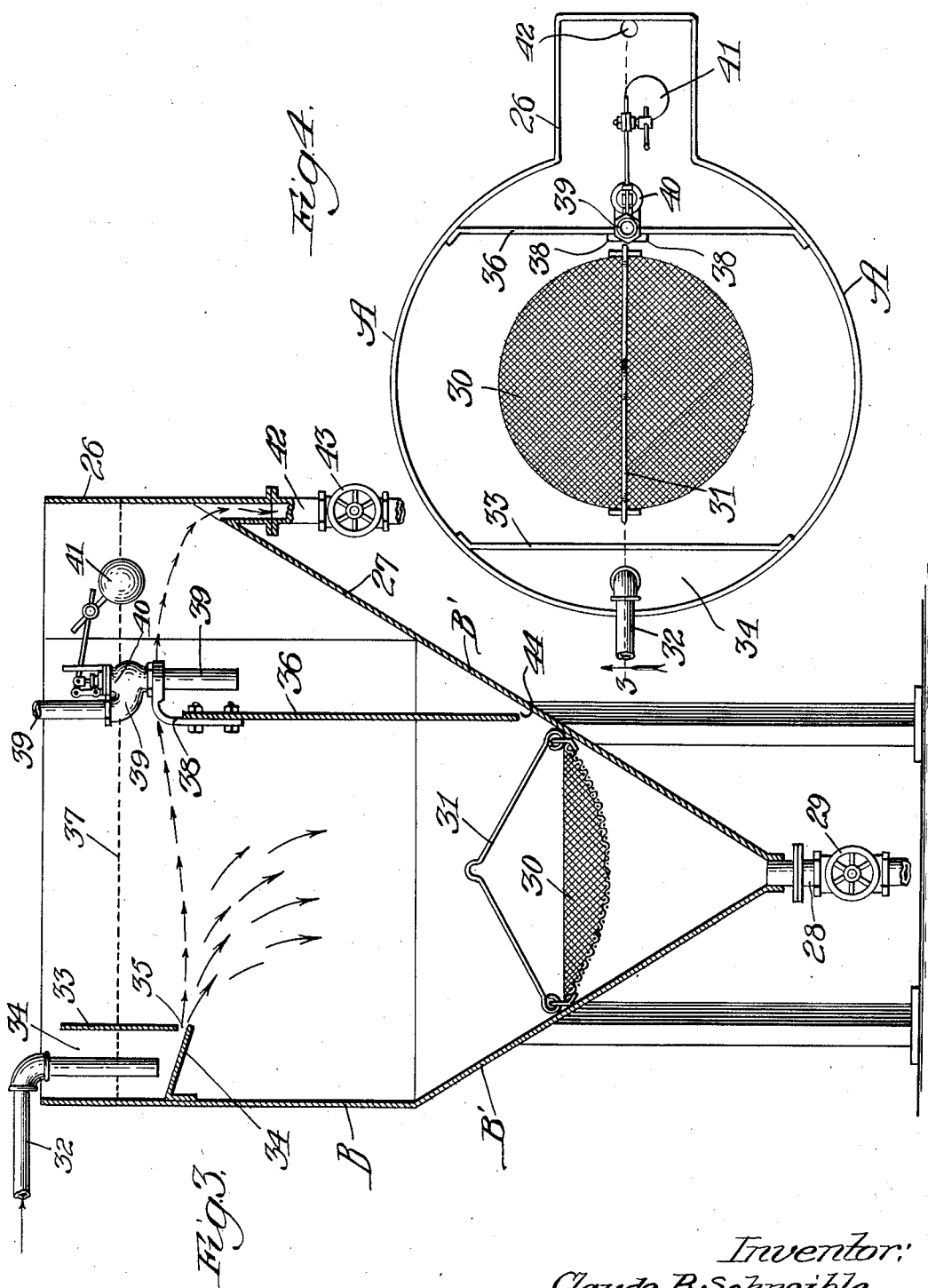

2,212,304

UNITED STATES PATENT OFFICE 2,212,304

SEPARATOR APPARATUS

Claude B. Schneible, Chicago, Ill.

Application December 13, 1937, Serial No. 179,574

8 Claims. (Cl. 210—60)

This invention relates to separator apparatus which is particularly useful in connection with the separating of solids from liquids.

An object of the invention is to provide simple and effective means for the separation of solids from liquids, the apparatus being kept constantly active by maintaining the liquid level therein above a predetermined point. A further object is to provide simple means whereby heavy particles carried by a liquid are caused to precipitate while the purified liquid is drawn off at the top, the operation being controlled by a single draw-off control at the bottom of the device. A further object is to provide separator apparatus which can be controlled by simple means, the apparatus being kept efficient by an automatic level-maintaining device. Other specific objects and advantages will appear as the specification proceeds.

The invention is illustrated in a preferred embodiment, by the accompanying drawings, in which—

Figure 1 is a broken vertical sectional view of apparatus embodying my invention; Fig. 2, a top plan view of the same; Fig. 3, a vertical sectional view of a modified form of the invention; and Fig. 4, a top plan view of the form shown in Fig. 3.

In the illustration given in Fig. 1 and Fig. 2, A designates a tank casing provided with a conical bottom portion A'. The casing A is provided on one side with a lateraly extending outlet box 10.

The casing A is provided on one side with a partition 11 and bottom flange member 12. The bottom flange 12 is separated a short distance from the bottom of partition 11 so as to provide a thin sluice or slot 13 through which the incoming liquid may diffuse in a thin and quiet stream through the main body of liquid within the tank. An inlet pipe 14 is supported so as to feed the liquid to be cleansed within the inlet box provided by walls 11 and 12.

On the opposite side of tank A is a similar partition wall 15 which extends downwardly a greater distance than wall 11 and which is provided with an open bottom communicating with the interior of tank A. Supported within the draw-off space formed betwen partition 15 and casing A is a liquid inlet valve 16 controlling inlet pipe 17. The valve 16 is controlled by the float member 18. The valve 16 is provided with a downwardly extending inlet pipe 19 which is supported by flange 20 upon partition wall 15.

The outlet box 10 is provided at its bottom with a draw-off pipe 21 controlled by valve 22.

The conical bottom A' is provided at its lower end with a draw-off pipe 23 which is controlled by valve 24 or, if desired, by a pump (not shown). Above the pipe 23 may be supported, if desired, a screen 25 which protects the valve or pump from particles above a predetermined size.

In the operation of the device, the liquid to be purified with its content of entrained matter enters the inlet box through pipe 14. It sinks below the liquid level which is maintained within the inlet box and then slowly diffuses through the thin elongated slot 13 into the body of the liquid within the central portion of the tank. Here, the solid particles tend to leave the quiescent liquid and to settle slowly toward the conical bottom A'. At the same time, the liquid which is freed of the solid material, tends to find its way back of partition 15 and into draw-off box 10.

The solid material is drawn off with a portion of the liquid through pipe 23 by means of control valve 24 or a pump, if a pump should be used. With the top outlet valve 22 opened to a desired degree, the apparatus is operated automatically by controlling slowly the bottom outlet valve 24, since the float valve 16 maintains the level of the liquid at the desired height. Thus, if the operator withdraws considerable material from the bottom of the cone A', the level of the liquid is still maintained above the liquid draw-off pipe 21 by means of the valve 16, fresh or clear liquid being introduced through pipe 17 and discharged through pipe 19 within the outlet space between partition 15 and wall A. With this arrangement, it will be observed that the freshly introduced liquid 17, which is preferably not contaminated and which need not be subjected to a separating operation, enters only within the outlet section between partition 15 and wall A and is carried away through outlet pipe 21. In other words, such water, which serves its purpose of maintaining the liquid level, is not mixed with the remaining liquid of the tank, but tends to overflow and pass out through pipe 21.

The apparatus is substantially automatic, it being necessary for the operator only to set the bottom outlet valve 24 or the pump, if a pump should be employed. The apparatus is kept always in efficient and functioning condition by the float valve which maintains the liquid level above the liquid draw-off line 21.

It will be observed that the outlet baffle 15 extends a substantial distance into the tank and that it lies substantially opposite the inlet slot 13. By this means, there is no tendency for the incoming sludge-laden liquid to pass directly out of the liquid outlet section. Instead, the sludge sinks to the bottom, allowing the supernatant liquid to float off through liquid outlet pipe 21.

In the form of the invention shown in Figs. 3 and 4, the casing B is provided with a conical bottom B'. On one side, the outlet box 26 is provided with an inclined bottom 27 substantially aligned with and joining the inclined bottom portion B', as shown more clearly in Fig. 3, thus presenting a continuous inclined surface.

The bottom portion B' is provided with an outlet 28 controlled by valve 29 or, if desired, a pump (not shown).

In the upper portion of the inclined bottom B' is supported a sieve 30 equipped with a bail 31 by which the sieve may be removed. The screen 30 is preferably inclined so as to form a pocket which cooperates with the bail so as to permit it to be removed readily through the upper portion of the casing B.

The tank B is provided on one side with an inlet pipe 32 which extends downwardly within the inlet partition 33. A bottom closure 34 forms a narrow weir or slot 35.

On the opposite side is outlet partition 36 which terminates below the normal level of the liquid indicated by the numeral 37, the upper portion of partition 36 being provided with a strap arm 38 supporting the fresh liquid inlet 39. The inlet 39 is controlled by valve 40 which when turned is operated by the float 41. Communicating with the lower portion of outlet box 26 is an outlet pipe 42 controlled by valve 43.

As shown more clearly in Fig. 3, the partition 36 extends downwardly toward the bottom cone portion B' providing an opening 44 through which material may silt downwardly toward the bottom of the tank.

In the operation of the apparatus shown in Figs. 3 and 4, the liquid and material carried thereby enters through pipe 32 and extends below the liquid level 37 within the inlet partition 33. The incoming liquid and entrained material diffuses slowly through the elongated slot or weir 35 and passes slowly in the direction of the arrows. The heavier material tends to sink toward the sieve and bottom B' while the supernatant liquid, freed of the heavier material, tends to move slowly over the partition 36 and then passes out through pipe 42. Any precipitation of material within the outlet partition portion tends to fall downwardly and to emerge through opening 44 into the bottom portion of the tank. The float valve provides a liquid level above partition 36 so that the supernatant liquid, freed of the heavier matter, can flow toward outlet 42. The portion of the tank above the level line 37 provides a surge space, particularly within the inlet box formed by partition 33 and bottom 34.

The screen 30 catches the heavier extraneous material which should not be passed through valve 29 or the pump (not shown) and such material may be readily removed by the use of the bail 31.

While in the foregoing description, I have used as an illustration specific apparatus and described the same in connection with the separating of solids heavier than the liquid, it will be understood that the apparatus may be modified considerably without departing from my invention, and further that the apparatus may be employed in connection with the separation of solids lighter than the liquid, the light material being drawn off through pipe 21 or an outlet in the main body of the tank at the top thereof while the cleansed liquid is removed at the bottom.

The foregoing detailed description has been given for clearness of understanding only, and no unnecessary limitations should be understood therefrom, but the appended claims should be construed as broadly as permissible, in view of the prior art.

I claim:

1. In separator apparatus of the character set forth, a tank provided with a draw-off line at its bottom, means for controlling said bottom draw-off, an inlet provided with a diffusing slot permitting incoming liquid to enter the tank below the liquid level thereof, a top-draw-off pipe, a second inlet adjacent said top draw-off pipe, a source of supply connected to said second inlet pipe, and valve means for said second inlet and responsive to the level of liquid in said tank, said valve means being adapted to permit additional liquid to be introduced into said tank to maintain the level of the liquid above said top draw-off pipe.

2. In separator apparatus of the character set forth, an inlet partition and an oppositely disposed outlet partition, means for introducing liquid into the space provided by said inlet partition, means for withdrawing liquid from the space provided by said outlet partition, and controlled withdrawal means communicating with the bottom of said tank, an inlet provided with a float valve controlling said inlet for maintaining the level of the liquid above said top draw-off pipe.

3. In separator apparatus of the character set forth, a tank provided with a draw-off pipe at its bottom, means for controlling said bottom draw-off, an inlet pipe, an outlet partition providing an outlet space between said partition and said tank, a liquid outlet pipe communicating with said outlet space, a second inlet pipe, and means automatically controlling said second inlet pipe for maintaining the level of the liquid above said liquid outlet pipe.

4. In separator apparatus of the character set forth, a tank provided with a conical bottom and a draw-off pipe communicating with said bottom, means for controlling said draw-off pipe, a partition on one side of said tank providing an inlet space, a partition on another side of said tank providing an outlet space, an inlet pipe communicating with said inlet space, a liquid outlet pipe communicating with said outlet space, and automatically operated means responsive to the level of liquid in sand tank for supplying fresh liquid to said outlet space to maintain the level of the liquid above said liquid outlet pipe.

5. In separator apparatus of the character set forth, a tank provided with a pair of partition walls diametrically opposed, the walls and partitions providing on one side an inlet space and on the opposite side an outlet space, a second wall associated with said inlet partition wall for providing a narrow slot through which liquid entering said inlet space may be diffused into the liquid in the interior of the tank, a draw-off pipe at the bottom of the tank, means for controlling said draw-off, a liquid outlet pipe communicating with said outlet space, a fresh water inlet communicating with said outlet space, and a float valve controlling said inlet.

6. In separator apparatus of the character set forth, an inlet partition and an oppositely disposed outlet partition, the top of said outlet partition being below the normal level of liquid in said tank, means for introducing incoming liquid below said inlet partition, means responsive to the level of liquid within the tank for maintaining the liquid level within said tank above said outlet partition, means for withdrawing liquid within the space formed by said tank and outlet partition, and means for withdrawing material from the lower portion of said tank and the lower portion of said space provided by said outlet partition and said tank.

7. In separator apparatus of the character set forth, a tank having a substantially conical bottom portion, an outlet box communicating with said tank and having an inclined bottom wall providing substantial continuation of the conical wall of said bottom, means for withdrawing liquid from said outlet box, an outlet partition between said box and said tank, said partition having its lower portion spaced from said conical bottom and automatic means responsive to the level of liquid within said tank for maintaining said level above the top of said outlet partition.

8. In separator apparatus of the character set forth, a tank, an inlet pipe, a draw-off pipe for said tank, means for controlling said draw-off, an outlet partition providing an outlet space in said tank, an outlet pipe communicating with said outlet space, a second inlet pipe, and means responsive to the level of liquid in said tank for automatically controlling said second inlet pipe to maintain the level of liquid above said outlet pipe.

CLAUDE B. SCHNEIBLE.